Nov. 22, 1949
R. O. HOLBROOK
2,488,539
RIM-REMOVING TOOL FOR PNEUMATIC TIRES
Filed Nov. 26, 1945
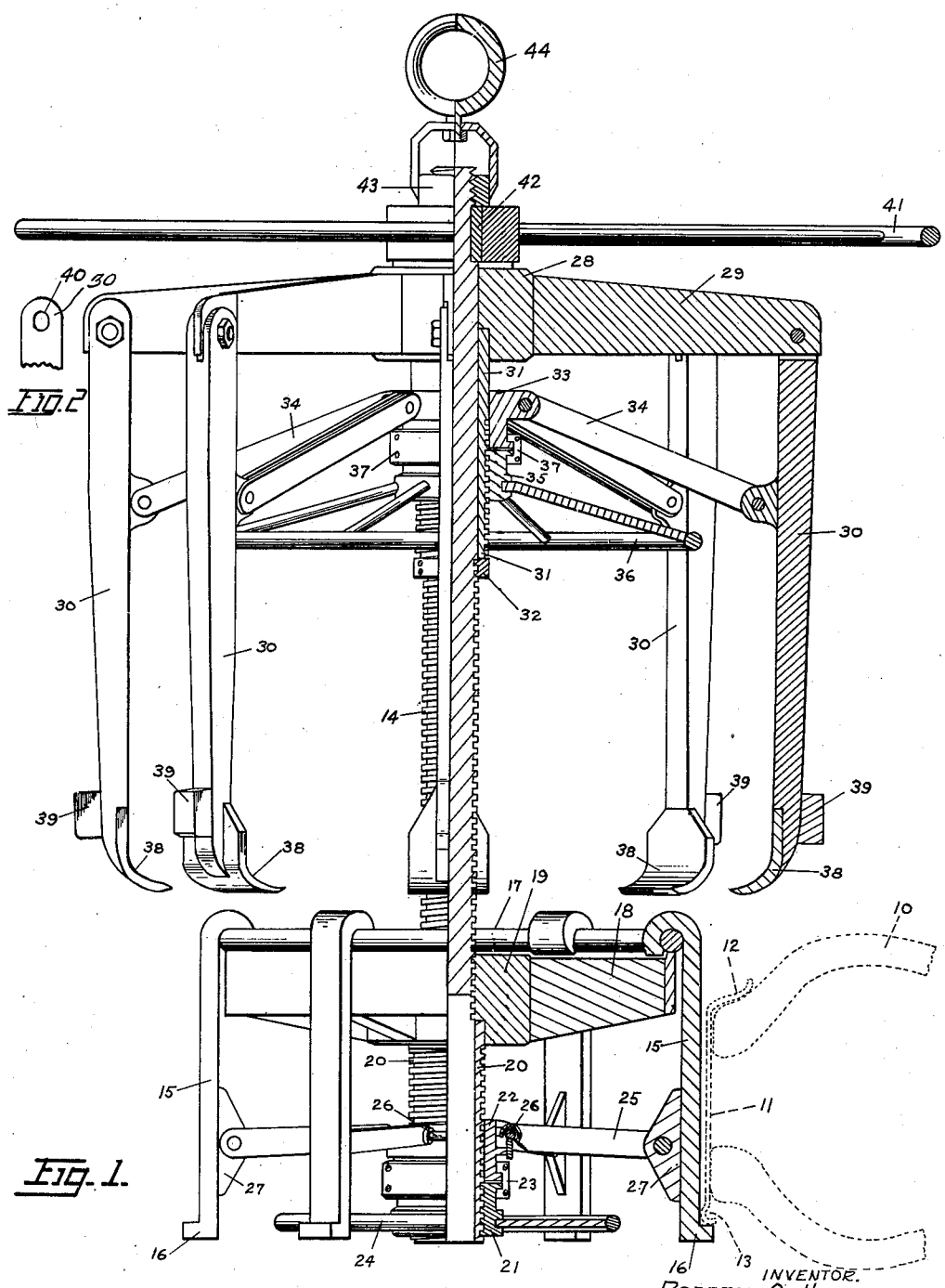
INVENTOR.
ROBERT O. HOLBROOK.
BY M. O. Hayes
ATTORNEY.

Patented Nov. 22, 1949

2,488,539

UNITED STATES PATENT OFFICE 2,488,539

RIM-REMOVING TOOL FOR PNEUMATIC TIRES

Robert O. Holbrook, United States Navy

Application November 26, 1945, Serial No. 630,956

1 Claim. (Cl. 157—1.2)

(Granted under the act of March 3, 1883, as amended April 30, 1928; 370 O. G. 757)

This invention relates in general to a tire casing removing device or press, and in particular to a device in which rim- and tire-engaging members are applied and forced in opposite directions to separate the rim and tire.

After a tire has been on a rim for a period of a month or longer, it is not unusual for a bond to form between the tire and the rim preventing easy separation of the two. Many methods employed in attempting to remove the tire from the rim usually result in considerable damage to the tire and entail a great deal of time and effort.

This invention is primarily designed for use on truck tires and rims that employ a removable lock ring, but may be adapted for use with any type rim for breaking loose the tire from the rim.

An object of this invention is to provide a tire and rim separating device.

Another object is to provide a tire casing removing device in which rim-engaging means and tire-engaging means are employed and in which further means are provided to move one or both aforementioned means in linear opposing directions to force the tire free from the rim.

Another object is to provide a tire-engaging means that can be urged inwardly between the flange of the rim and the tire.

Another object is to provide a rim-engaging means moveable inwardly toward and outwardly from a central axis to engage and disengage a tire rim.

Further objects and advantages of this invention, as well as its construction, arrangement and operation, will be apparent from the following description and claim in connection with the accompanying drawing, in which Figure 1 is an elevation, half in cross-section, illustrating an embodiment of the invention, and Figure 2 shows a portion of a tire-engaging arm embodied in the invention.

The drawing shows a tire assembly comprising a tire casing 10, mounted on rim 11, the rim having a flange 12. The edge 13 of the rim normally carries a removable lock ring, not shown as it is removed before the tire is dismounted.

A central threaded standard or screw 14 carries the rim-engaging means which comprises a plurality of removable fingers 15, each having a lip 16 adapted to engage edge 13 of rim 11. The fingers 15 are pivotally carried by ring 17 which, by means of the carriage comprising the radial arms 18 and hub 19, is threaded to the screw 14.

Secured to hub 19 is a hollow externally threaded sleeve member 20. Threaded to member 20 is the hub 21 of the hand wheel 24. Threaded hub 21 and sliding sleeve 22 are connected together by retainer 23 which enables the hub 21 to traverse sleeve 22 longitudinally of sleeve 20.

A plurality of links 25 are pivotably secured to but removable from ring 26, carried by sleeve 22, and to lugs 27 on each of the fingers 15.

The tire-engaging member is also carried by the screw 14, and it comprises a carriage having a hub 28 and radial spokes 29 from which the arms 30 are pivotally suspended.

Hub 28 is supported by an externally threaded sleeve 31 which, with the carriage of arms 30, is adapted to slide longitudinally of screw 14. A collar 32 is secured to screw 14 at a predetermined position and supports or retains the tire-engaging member in fixed position longitudinally of screw 14. The hub 28 of the carriage of the tire-engaging member is mounted rotatably on the shaft of screw 14, and the sleeve 31 provides a thrust bearing which locates the hub 28 lengthwise of screw 14.

A collar or hub 33 is mounted to slide along sleeve 31 and carries a plurality of links 34 pivotably attached thereto. Each of said links 34 is also pivotally connected at the other end, to one of the arms 30. Hub 35 of the tire-engaging member hand wheel 36 is threaded to the sleeve 31 and is rotatably connected to hub 33 by retainer 37.

Attached to the end of each arm 30 is an inwardly curved enlarged portion or member 38 which is adapted to contact the tire 10. A hammer block 39 is positioned behind and slightly above each curved member 38. The upper end of each arm 30 is provided with an elongated opening 40 (Figure 2) at the position said arms 30 depend from spokes 29.

Rotation of the central screw 14 is accomplished by means of the hand wheel 41 which is suitably secured thereto by means of key 42 and lock nut 43.

An eye 44 may be provided for lifting and supporting the entire assembly.

In operation, the lock ring, not shown, is first removed from the rim 11, and the tire 10 and rim 11 placed flat with the flange 12 in up position. The tire press is then positioned, by means of ring 44, concentrically within the rim 11, and the fingers 15 are manipulated by actuation of handwheel 24 to place the edge of the rim 13 on the lips 16 of fingers 15, fingers 15 being forced outwardly to form engagement with rim 11.

Handwheel 41 is then rotated to raise the carriage 18, 19 on the screw 14, and thereby to raise the tire assembly into engagement of casing 10 with the curved members 38 of arms 30. Handwheel 36 is also rotated to position the curved member 38 between the casing 10 and flange 12 of rim 11. If necessary a hammer is used on hammer blocks 39.

When the curved members 38 have been firmly placed between the tire 10 and flange 12, handwheel 41 is again rotated to traverse the carriages 18, 19 and 28, 29 towards each other. The tire engaging members 38 and lips 16 move opposed to each other to actuate the casing 10 off of the rim 11.

The fingers 15 and arm 25 are removable from the carriage 18, 19, as shown, to allow the apparatus to be used with some special type rims which the press would not otherwise normally fit.

The hand-operated screw presses now in operation exert up to five tons pressure which is normally sufficient. In certain extreme cases however greater pressure has been required and has been obtained by replacing the wheel and screw with hydraulic mechanism. Other substitutions could obviously be made.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

In apparatus for disassembling the assembly of a tire and a rim, a screw comprising an attachment at one end thereof to suspend it from an overhead support, a rim engaging component comprising a carriage threaded to the screw at the lower end thereof, a plurality of rim engaging arms suspended from the carriage of the rim engaging component in a circle coaxial with the screw, mechanism between the rim engaging arms and their carriage operable alternatively to spread or retract the several arms in unison, a tire engaging component comprising a carriage mounted rotatably on the screw, a thrust bearing holding the carriage of the tire-engaging component at a predetermined position lengthwise of the screw, a plurality of tire engaging arms mounted on the carriage of the tire engaging component in a circle coaxial with the screw, mechanism between the tire engaging arms and their carriage operable alternatively to spread or retract the several arms in unison, a device to rotate the screw to traverse the carriage of the rim engaging component relative to the tire engaging component.

ROBERT O. HOLBROOK.

REFERENCES CITED

The following references are of record in the file of this patent:

UNITED STATES PATENTS

| Number | Name | Date |
|---|---|---|
| 1,552,928 | Hershon | Sept. 8, 1925 |
| 1,564,092 | Miller | Dec. 1, 1925 |
| 1,564,496 | Staugaard | Dec. 8, 1925 |
| 1,729,861 | Anderson | Oct. 1, 1929 |
| 2,373,975 | Plumeau et al. | Apr. 17, 1945 |
| 2,446,963 | Stolz | Aug. 10, 1948 |

FOREIGN PATENTS

| Number | Country | Date |
|---|---|---|
| 659,107 | Germany | Apr. 25, 1938 |